(12) United States Patent
Shimizu

(10) Patent No.: US 9,164,980 B2
(45) Date of Patent: Oct. 20, 2015

(54) NAME IDENTIFICATION RULE GENERATING APPARATUS AND NAME IDENTIFICATION RULE GENERATING METHOD

(75) Inventor: Toshihiro Shimizu, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 352 days.

(21) Appl. No.: 13/449,914

(22) Filed: Apr. 18, 2012

(65) Prior Publication Data

US 2012/0310648 A1 Dec. 6, 2012

(30) Foreign Application Priority Data

Jun. 3, 2011 (JP) .................................. 2011-125602

(51) Int. Cl.
G06F 17/27 (2006.01)

(52) U.S. Cl.
CPC ............ *G06F 17/271* (2013.01); *G06F 17/278* (2013.01)

(58) Field of Classification Search
None
See application file for complete search history.

(56) References Cited

U.S. PATENT DOCUMENTS

| | | | | |
|---|---|---|---|---|
| 5,495,413 | A * | 2/1996 | Kutsumi et al. .................... | 704/4 |
| 5,864,788 | A * | 1/1999 | Kutsumi ............................. | 704/2 |
| 5,903,858 | A * | 5/1999 | Saraki ............................... | 704/4 |
| 6,839,670 | B1 * | 1/2005 | Stammler et al. ............. | 704/251 |
| 7,493,252 | B1 * | 2/2009 | Nagano et al. ..................... | 704/9 |
| 8,340,270 | B2 * | 12/2012 | Jain et al. ................. | 379/207.15 |
| 8,359,191 | B2 * | 1/2013 | Chen et al. ......................... | 704/9 |
| 2001/0014899 | A1 * | 8/2001 | Fujikawa ....................... | 707/513 |
| 2002/0111793 | A1 * | 8/2002 | Luo et al. .......................... | 704/10 |
| 2003/0171915 | A1 * | 9/2003 | Barklund et al. ................... | 704/9 |
| 2003/0176999 | A1 * | 9/2003 | Calcagno et al. ................... | 704/9 |
| 2003/0208354 | A1 * | 11/2003 | Lin et al. ............................ | 704/9 |
| 2004/0044519 | A1 * | 3/2004 | Polanyi et al. ..................... | 704/9 |
| 2004/0193401 | A1 * | 9/2004 | Ringger et al. .................... | 704/9 |
| 2005/0065776 | A1 * | 3/2005 | Coden et al. ..................... | 704/10 |
| 2005/0137849 | A1 * | 6/2005 | Parkinson ......................... | 704/4 |
| 2005/0289231 | A1 * | 12/2005 | Harada et al. ................. | 709/224 |
| 2006/0288327 | A1 * | 12/2006 | Torgerson et al. ............. | 717/105 |
| 2007/0179776 | A1 * | 8/2007 | Segond et al. ..................... | 704/9 |
| 2007/0219773 | A1 * | 9/2007 | Roux et al. ........................ | 704/1 |
| 2007/0260450 | A1 * | 11/2007 | Sun ................................... | 704/9 |
| 2008/0022264 | A1 * | 1/2008 | Macklem et al. ............. | 717/136 |
| 2010/0077092 | A1 * | 3/2010 | Akaboshi ...................... | 709/230 |
| 2011/0087630 | A1 | 4/2011 | Harada et al. | |
| 2012/0143595 | A1 * | 6/2012 | Li et al. ............................. | 704/9 |
| 2012/0226492 | A1 * | 9/2012 | Tsuboi et al. ...................... | 704/9 |

FOREIGN PATENT DOCUMENTS

| | | |
|---|---|---|
| JP | 5-143639 | 6/1993 |
| JP | 2005-56183 | 3/2005 |
| JP | 2006-11683 | 1/2006 |
| JP | 2010-67047 | 3/2010 |
| JP | 2010-165205 | 7/2010 |

\* cited by examiner

*Primary Examiner* — Richemond Dorvil
*Assistant Examiner* — Thuykhanh Le
(74) *Attorney, Agent, or Firm* — Staas & Halsey LLP

(57) ABSTRACT

A name identification rule generating method, includes: generating an abstract syntax tree by removing a portion of an input sentence unrelated to a process in analysis of syntax of the input sentence by a computer; setting, in generating the abstract syntax tree, nodes corresponding to a plurality of arguments at the same layer; and generating, in generating the abstract syntax tree, a first character string pattern including a second character string corresponding to a node of the abstract syntax tree where a number of types of terminal symbols on the node is equal to or smaller than a certain multiple of a number of types of processes that call the input sentence.

8 Claims, 17 Drawing Sheets

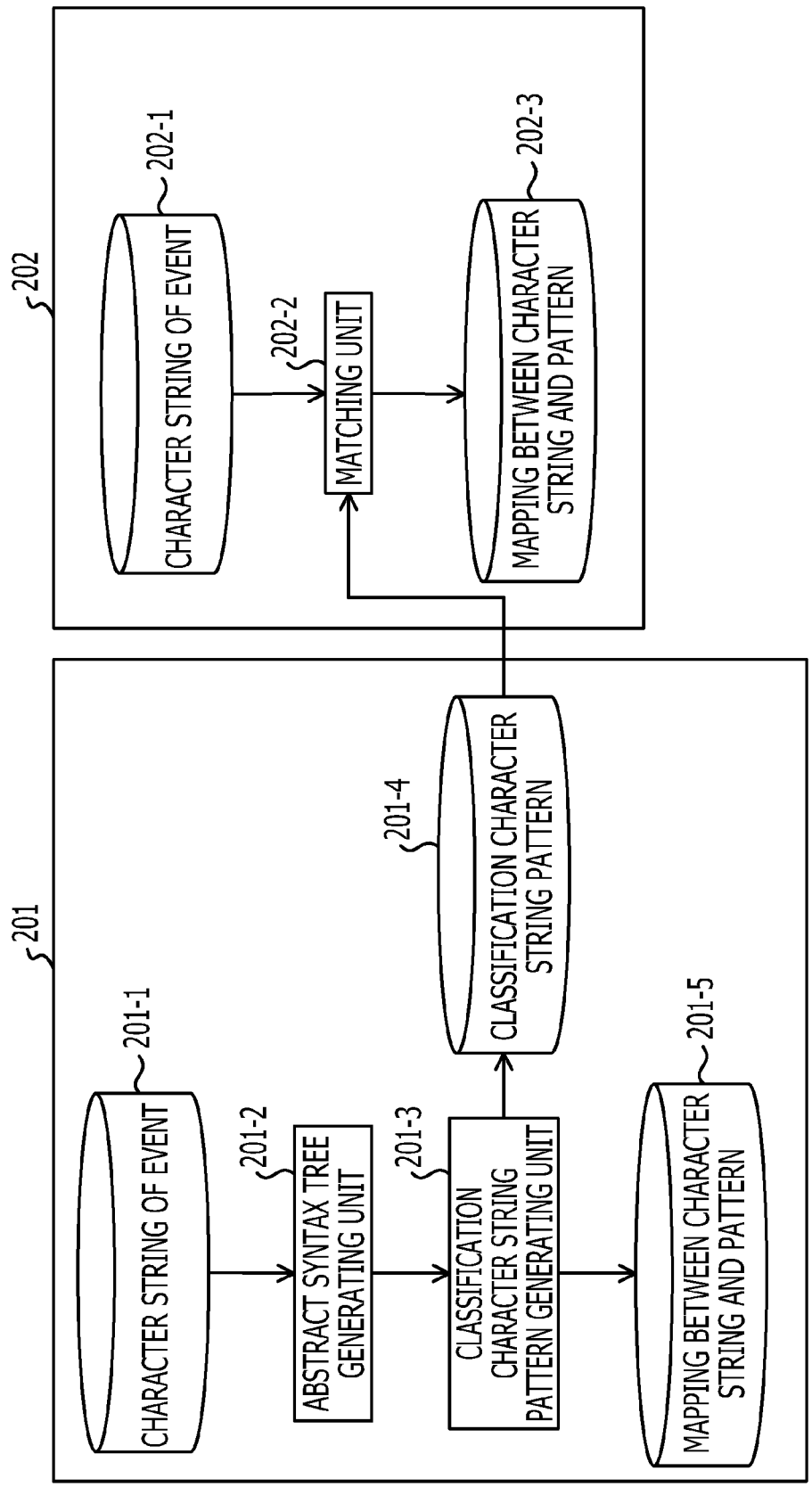

FIG. 3A
(1+2)+3
FIG. 3B
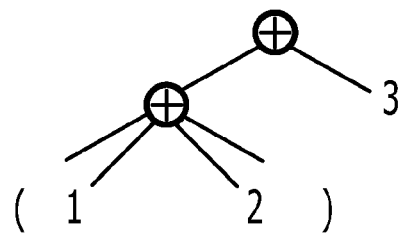
FIG. 3C
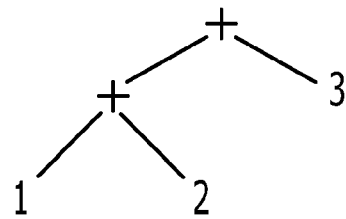
FIG. 3D
SELECT X FROM A,B,C
FIG. 3E
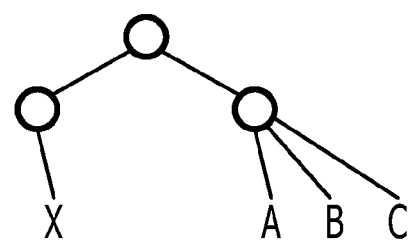

DELETE EMPLOYEE WHERE LNAME =.*

FIG. 16A
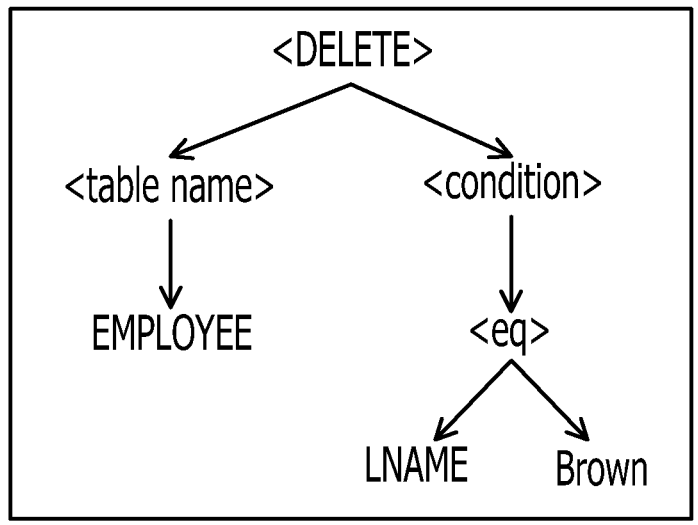
FIG. 16B
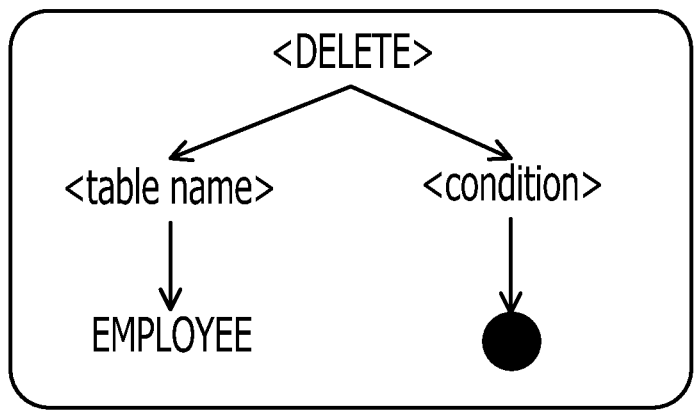
FIG. 16C
DELETE EMPLOYEE WHERE LNAME = Brown
FIG. 16D
DELETE EMPLOYEE WHERE .*

NAME IDENTIFICATION RULE GENERATING APPARATUS AND NAME IDENTIFICATION RULE GENERATING METHOD

CROSS-REFERENCE TO RELATED APPLICATION(S)

This application is based upon and claims the benefit of priority of the prior Japanese Patent Application No. 2011-125602, filed on Jun. 3, 2011, the entire contents of which are incorporated herein by reference.

FIELD

The embodiments discussed herein are related to a name identification rule generating apparatus and a name identification rule generating method of classifying events.

BACKGROUND

In a computer system, events may be classified in accordance with visualization of the system. In the system visualization, a relationship (model) of one event occurring as a result of another event may be estimated (modeled), and observed data is matched against the estimated model.

Related art is discussed in Japanese Laid-open Patent Publication Nos. 2006-11683 and 2010-67047.

SUMMARY

According to one aspect of the embodiments, a name identification rule generating method, includes: generating an abstract syntax tree by removing a portion of an input sentence unrelated to a process in analysis of syntax of the input sentence by a computer; setting, in generating the abstract syntax tree, nodes corresponding to a plurality of arguments at the same layer; and generating, in generating the abstract syntax tree, a first character string pattern including a second character string corresponding to a node of the abstract syntax tree where a number of types of terminal symbols on the node is equal to or smaller than a certain multiple of a number of types of processes that call the input sentence.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an exemplary name identification system;
FIGS. 3A-3E illustrate an exemplary abstract syntax tree;
FIGS. 16A-16D illustrate an exemplary output of a classification character string pattern.

DESCRIPTION OF EMBODIMENT

A parser may have difficulty in identifying names in a language described through context-free grammar, such as database query language including a structured query language (SQL).

When specific portions are extracted from tree-structured results output from a parser using a regular expression and make a comparison, a grammatically inadequate character string may be extracted.

When a transaction model for balance inquiry is produced in an Internet banking system, parameters such as a period and user ID are different from transaction to transaction, but parameters such as a referenced table may be common. In the production of the balance inquiry, a process in which events indicated by different character strings are identified with each other may be referred to as name identification. The name identification means that the identity of holders of a plurality of bank accounts is determined in accordance with attribute information such as names, birth dates, or addresses. Part of the character string may be attribute information for the name identification. In the name identification in system visualization, character strings may be identified with each other based on identity of parts of the character strings. Events may be generalized.

In the system visualization of the balance inquiry in the Internet banking system, the name identification may be performed in accordance with a portion of the character string in a table storing account information in place of the parameters such as the user ID and the period.

Visualization may be performed in the World Wide Web (WWW) system (hereinafter referred to as "Web system") using hyper text transfer protocol (HTTP). HTTP requests having a substantially identical parameter of a common gateway interface (cgi) are treated as identical. Regardless of parameters of users, the name identification may be performed with certain types of processes considered to be substantially identical. Three HTTP requests in uniformed resource locator (URL) form are described below:

http://service.com/index.html?uid=kuroyanagi&com=1
http://service.com/index.html?uid=tanaka&com=1
http://service.com/index.html?uid=shimizu&com=1

The name identification may be performed in accordance with parameter character strings "com=1" regardless of parameter character strings indicating user IDs, "uid=kuroyanagi", "uid=tanaka", and "uid=shimizu".

Figure 1:
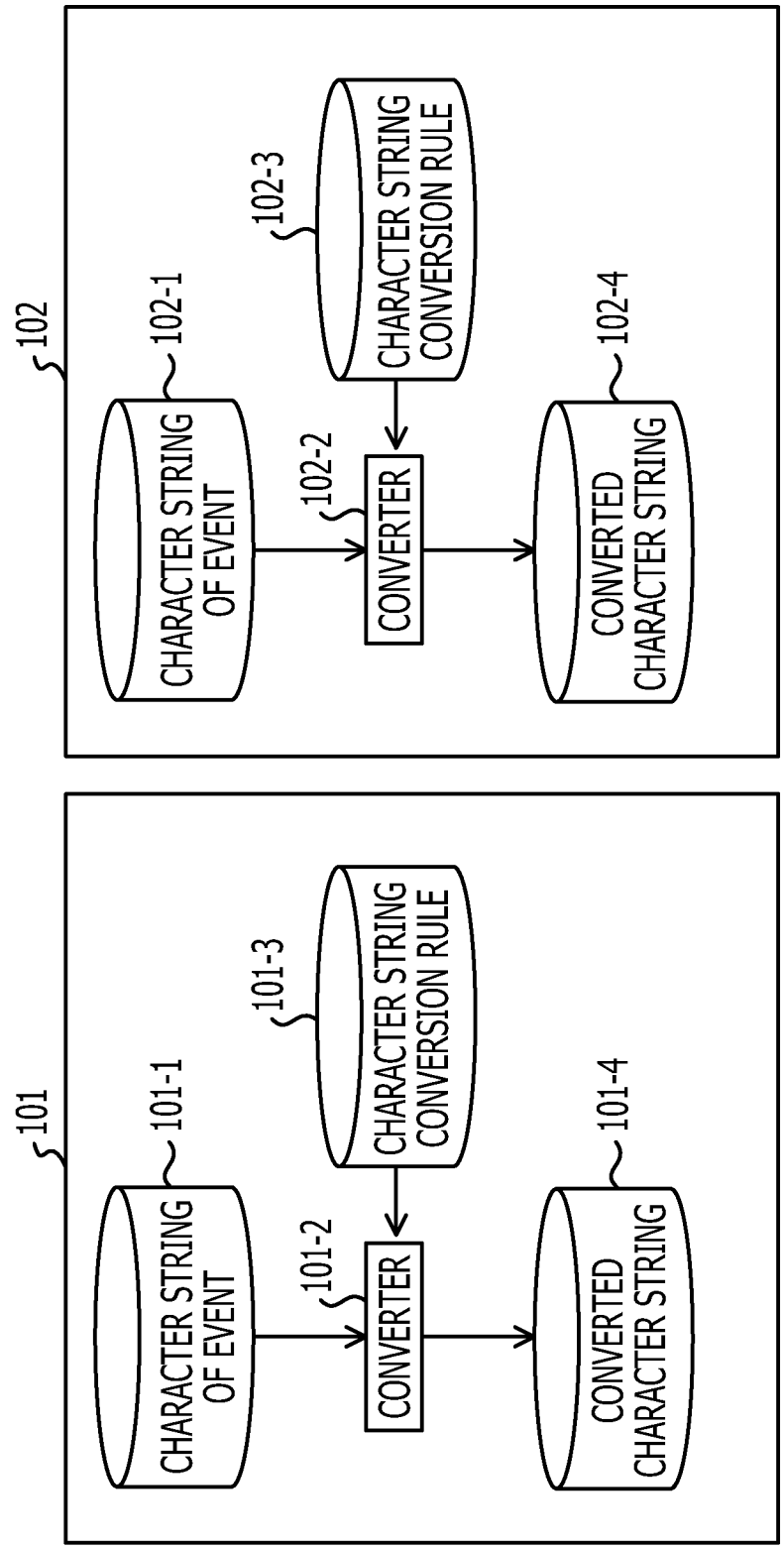
FIG. 1 illustrates an exemplary name identification system.

FIG. 1 illustrates an exemplary name identification system. A modeling apparatus 101 generates a model of an event in system visualization. In accordance with a character string conversion rule 101-3, a converter 101-2 converts a character string 101-1 of an event serving as an input model, and then outputs the converted character string 101-4. The character string conversion rule 101-3 may be a rule for generating a tree structure by parsing the event character string 101-1. The converter 101-2 parses the character string 101-1 of the event in accordance with the character string conversion rule 101-3, and outputs the converted character string 101-4.

A matching apparatus 102 executes a matching operation on an event in system visualization. A converter 102-2 parses the character string 102-1 of an observed event in accordance with a character string conversion rule 102-3 substantially identical to the character string conversion rule 101-3 of the matching apparatus 101. The converter 102-2 generates a converted character string 102-4 having a tree structure corresponding to the observed event.

Out of the converted character strings 102-4, those converted to character strings 101-4, which correspond to events becoming the same model, are determined to be the same event.

In a three-layer system including a Web server, an application server, and a database server, a name identification system may include a system that calculates a process time of a service providing function based on observations of each transaction. An operational status of the system may be learned in accordance with an observation of data (event) flowing over a network without the service providing function on a computer. A startup relationship between events is estimated by matching against observed data a relationship (model) of the tree structure of the event type obtained from pre-retrieved data and generated in response to an event. Time as to how long each transaction takes as a process time at what layer may be learned.

URI in the Web system may be name-identified. Name identification may be performed on simple structures like URIs responsive to HTTP requests. Name identification may be performed on a language described through context-free grammar, such as database query language including a structured query language (SQL).

It may be difficult to specify a character conversion rule on an event character string described in context-free grammar. Parsing is a slow process, and parsing on a real-time basis on each event that is described in context-free grammar may be difficult.

The character string conversion rules 101-3 and 102-3 of FIG. 1 may be a character string conversion rule that, using a regular expression, specifies a location of a character string to be neglected. For example, the regular expression may be described as follows:

s/SELECT (.*) FROM .*/SELECT $1 FROM . . . /g(1)

In the conversion rule, a character string of an input event is a character string "SELECT", followed by any first character string, a character string "FROM", and a second character string. A character string "SELECT first character string FROM" is output as a converted character string. "s/A/B/g" indicates a substitution operator that converts the whole input sentence from a character string pattern A into a character string pattern B. According to conversion rule (1), variable "$1" in the field corresponding to the character string pattern B in the substitution operator specifies referencing and transferring a portion of "(.*)" within a field corresponding to the character string pattern A.

For example, using the conversion rule (1), the following SQL sentence (2) input as a character string of an event may be converted to output a converted character string (3).

SELECT zandaka FROM table1 WHERE EXISTS (SELECT b FROM t)(2)

SELECT zandaka FROM . . . (3)

According to the conversion rule (1), the character string "zandaka FROM table1 WHERE EXISTS (SELECT b", followed by the second character string "FROM" of the event character string (2) matches as "$1". Therefore, the converted character string may be a converted character string (4).

SELECT zandaka FROM table1 WHERE EXISTS (SELECT b FROM . . . (4)

In the character string conversion rule that, using the regular expression, specifies a location of a character string to be neglected, matching may not be performed correctly.

In the character string of the event in the SQL sentence (2), a name identification rule outputting the converted character string (3) may be generated. A substitution pattern in the character string conversion rule may be a pattern in which substantially the same regular expression as that in the conversion rule (1) is used. An appropriate location of the character string accounting for the context-free grammar may be specified by the substitution pattern.

FIG. 2 illustrates an exemplary name identification system. A modeling apparatus 201 generates a classification character string pattern 201-4 serving as a model of an event in the visualization of the system. The classification character string pattern 201-4 is a substitution pattern of a character string conversion rule in which a location of a character string location accounting for the context-free grammar is in a regular expression.

An abstract syntax tree generating unit 201-2 in the modeling apparatus 201 receives a character string 201-1 of an event as an input sentence serving as a model, and then parses the input sentence. A portion of each parse tree not related is removed, each node corresponding to each of available arguments is set to the same layer, and generates an abstract syntax tree corresponding to each input sentence.

The abstract syntax tree is a parse tree where a portion unrelated to the program, for example, parentheses or keywords expressly arranged, which are not determined in the analysis of the character string, are removed from the parse tree. FIGS. 3A-3E illustrate an exemplary abstract syntax tree. A character string "(1+2)+3" of FIG. 3A may be input. The parsing process is performed on the character string, resulting in a parse tree of FIG. 3B, where input numbers "1", "2", "3", operation symbol "+", and the parentheses unrelated to the program are set in nodes. In the abstract syntax tree, the tree is formed with the parentheses removed. Therefore, as illustrated in FIG. 3C, the input numbers "1", "2", and "3" that are used to compare the character strings are arranged in nodes.

When an SQL sentence "SELECT X FROM A, B, C" of FIG. 3D is input as the event character string 201-1, an abstract syntax tree of FIG. 3E is generated. In a portion expressed by a list, such as a portion "A, B, C" that is delineated by commas, and that may take a plurality of arguments, a node corresponding to the arguments "A", "B", and "C" is expanded at the same layer, as illustrated in FIG. 3E.

If the size of the event character string 201-1 is large, the number of independent character strings which are not related to the type of the process, for example, personal id, is larger than the number of types of processes. The number of character strings which are dependent on the type of the process, for example, a table name, may be small, may be several times the number of types of processes. The multiple number may include 1.

Of the same syntax, a character string pattern is generated by referencing a location of the character string that occurs by several times the number of types of call processes with the other location neglected. The character strings are thus classified. If the number of types of processes is one, a delete process may be performed on a record on a table EMPLOYEE of a database described below.

DELETE EMPLOYEE WHERE LNAME=suzuki
    DELETE EMPLOYEE WHERE LNAME=tanaka
    DELETE EMPLOYEE WHERE LNAME=shimizu It may be determined that a section subsequent to LNAME= be neglected. Without using the knowledge that LNAME represents a person's name, character strings of nodes classified into a plurality of trees for a caller process as one type of process are independent of the type of process, and are thus neglected. In order to generate a particular classification character string pattern, a character string that is in regular expression in accordance with the type of process is appropriately specified. Since the type of process is not identified in the field of cloud computing, the classification character string pattern with the regular expression set therewithin may not be generated.

The regular expression is set on the character string using a determination process of the abstract syntax tree without using the knowledge of the type of the process.

A generation rule of a certain type of a process generated in a computer system, for example, a character string of an event requesting a business operation, for example, a keyword on programming such as "SELECT", "DELETE" and "FROM" in an SQL sentence or "WHERE" in programming is defined. A generation rule to aggregate data, such as parentheses, is also defined. The keywords or the parentheses may be removed, and an abstract syntax tree may be generated where a plurality of character strings included in a list are set in a node at the same layer. At a specific layer on the generated abstract syntax tree, a determination is made as to what value changes in response to the type of a process, and what value does not change in response to the type of the process. A character string with a regular expression set therewithin is thus determined. Since the plurality of character strings included in the list are set at the node of the same layer, whether an abstract syntax tree is in the same shape or not is determined.

A classification character string pattern generating unit 201-3 in the modeling apparatus 201 of FIG. 2 performs a process to be discussed below on the abstract syntax trees having the same shape out of the abstract syntax trees generated by the abstract syntax tree generating unit 201-2. If the type of the terminal symbol of each node is a type of call process to call the event character string 201-1, a character string pattern including a character string corresponding to a node of a common portion where the number of types of the terminal symbols of the node of the tree is equal to or smaller than a specific multiple of the number of types of the processes is generated. The character string pattern may be generated as the classification character string pattern 201-4 that is used to classify the character string 202-1 of the event as the input sentence. The classification character string pattern 201-4 may be a pattern that includes a regular expression. A character string accounting for the context-free grammar is specified by the classification character string pattern 201-4. Therefore, the name identification process may be performed accurately at a high speed. Mapping 201-5 between the character string 201-1 of the event as the input sentence and the classification character string pattern 201-4 may be stored.

A modeling apparatus 202 performs a matching operation on events. A matching unit 202-2 performs a pattern matching operation between the character string 202-1 of a event which is input and observed and the classification character string pattern 201-4 generated by the modeling apparatus 201. If a pattern match is provided, the matching unit 202-2 stores mapping 202-3 between the character string of event 202-1 and the classification character string pattern 201-4.

Figure 4:
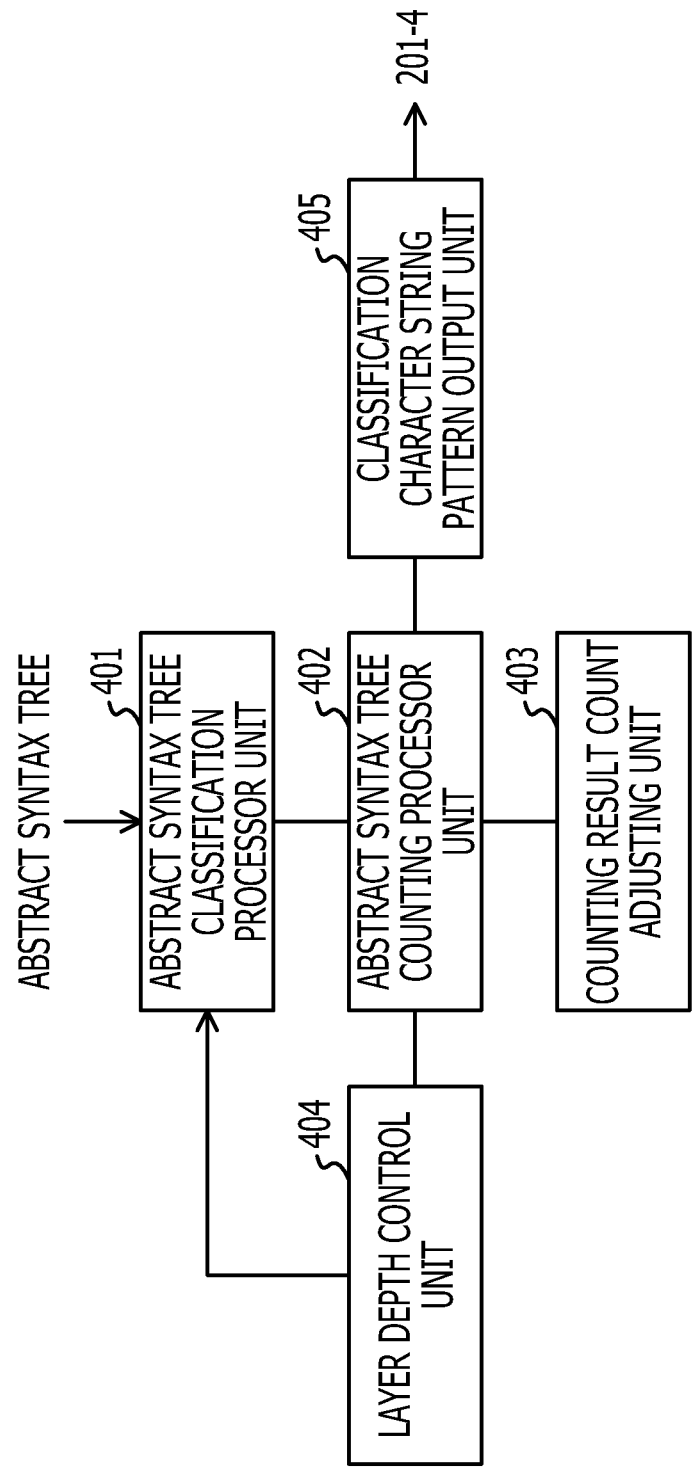
FIG. 4 illustrates an exemplary classification character string pattern generating unit.

FIG. 4 illustrates an exemplary classification character string pattern generating unit. The classification character string pattern generating unit may be the classification character string pattern generating unit 201-3 of FIG. 2. An abstract syntax tree classification processor unit 401 views each abstract syntax tree generated by the abstract syntax tree generating unit 201-2 of FIG. 2 from a first layer corresponding to the root node down to a depth of a specific layer. The abstract syntax tree classification processor unit 401 classifies at the specific layer the abstract syntax trees into a set of abstract syntax trees having identical nonterminal symbols of nodes excluding leaf nodes. The leaf nodes change relatively frequently even in the same type of process. The identity of the trees may be determined using the nonterminal symbols at the node other than the leaf nodes. The abstract syntax tree corresponding to the character string 201-1 of the event belonging to the same type of process is thus classified. As illustrated in FIGS. 3A-3D, the abstract syntax tree is generated such that a plurality of character strings included in the list become the node of the same layer. The character string portion included in the list may relatively frequently change even in the same type of process. The leaf nodes of the list are thus set at the same layer, and are removed in the identity determination, per process type, of the abstract syntax tree.

In the set of the classified abstract syntax trees, an abstract syntax tree counting processor unit 402 lists locations of a character string corresponding to a node of a common portion where the number of types of the terminal symbols of the node of the tree is equal to or smaller than the specific multiple of the number of types of the processes. Counted are the types of abstract syntax trees that are acquired by neglecting the nodes other than a node of the common portion listed. In the abstract syntax trees having the same type of process, name identification is performed on nodes having many types of occurring terminal symbols. A portion where a variety of values occur may be set as a target portion of the regular expression, and may not be patterned.

If the count value is equal to or higher than an upper limit threshold value, a counting result count adjusting unit 403 adjusts the count value in a manner such that the count value becomes lower than the upper limit threshold value by successively neglecting the nodes in the order starting with a node having the largest number of types of terminal symbols. If the count value is high, the counting result count adjusting unit 403 determines that accurate patterning is not performed and removes from the patterning targets the nodes in the order starting with a node having the largest number of types of terminal symbols.

If the count value becomes lower than a lower limit threshold value, a layer depth control unit 404 increases the depth of the specific layer. The abstract syntax tree classification processor unit 401, the abstract syntax tree counting processor unit 402, and the counting result count adjusting unit 403 may be repeated. When the count value is reduced to one, for example, the trees are united and regarded as the same, pattern classification may be performed to a deeper layer of the abstract syntax tree.

Figure 5:
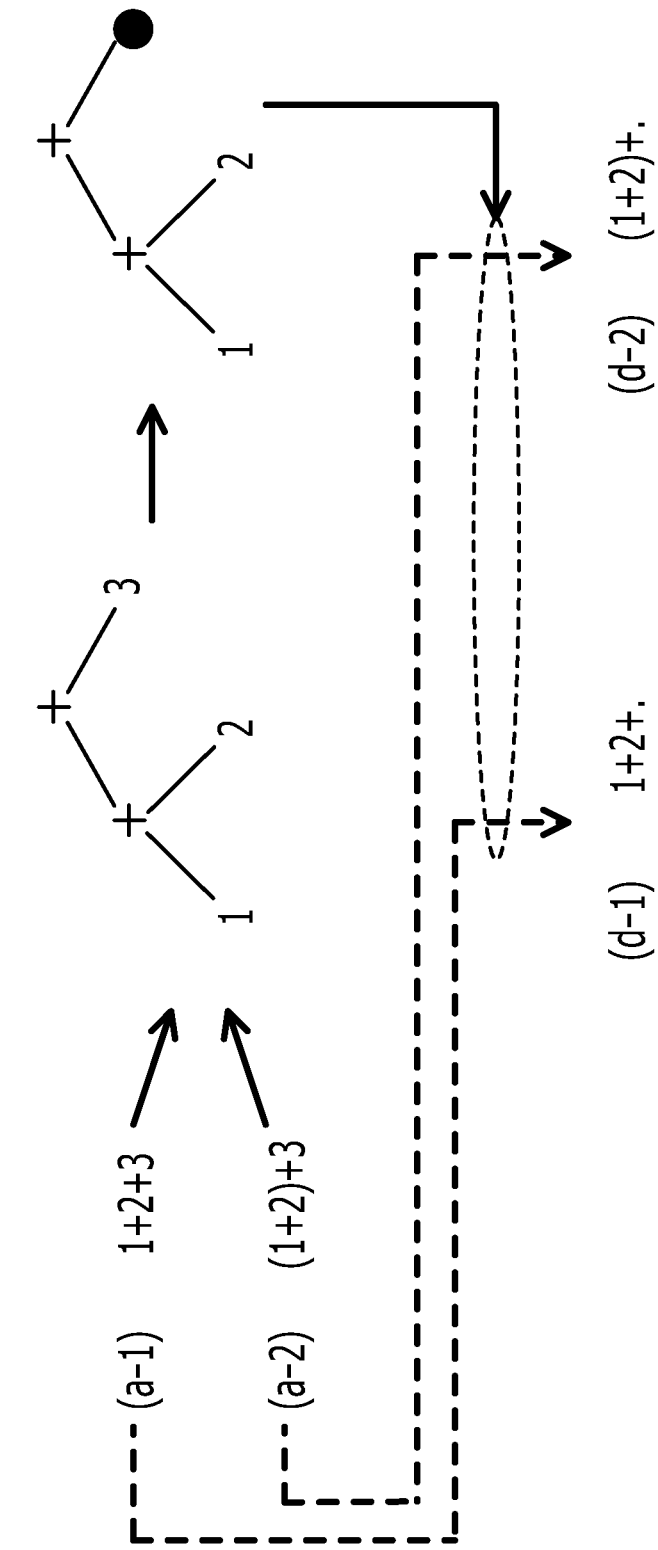
FIGS. 5A-5D illustrate an exemplary character string pattern generation method.

When the count value is equal to or higher than the lower limit threshold value and lower than the upper limit threshold value, a classification character string pattern output unit 405 may perform the process described below. A classification character string pattern including a character string portion corresponding to the node of the common portion, such as the classification character string pattern 201-4 of FIG. 2, from the character string 201-1 (see FIG. 2) of the event of the sentence corresponding to the abstract syntax tree included in the classified set. FIGS. 5A-5D illustrate an exemplary generation method of a character string pattern. The classification character string pattern 201-4 of FIG. 2 may be generated. Even if the character string 201-1 of the input event is any of the character string "1+2+3" and the character string "(1+2)+3" illustrated in FIG. 5A, the abstract syntax tree of FIG. 5B is generated. The abstract syntax tree counting processor unit 402 of FIG. 4 may remove the node corresponding to a number "3" and denoted by a solid dot, and may determine a tree having a pattern of FIG. 5C. In order to know the rule of the character string generation of the event where the classification character string pattern 201-4 including the regular expression is generated based on the tree of the pattern of FIG. 5C, the classification character string pattern 201-4 is generated based on the original character string 201-1 from which the stored abstract syntax tree is generated. For example, if the original character string is the character string "1+2+3" of FIG. 5A, the classification character string pattern 201-4 may be "1+2+." of FIG. 5D. If the original character string is the character string "(1+2)+3" of FIG. 5A, the classification character string pattern 201-4 may be "(1+2)+." of FIG. 5D. Here "." represents the regular expression corresponding to any one character. Parentheses in the character string may affect a matching performance of a pattern matching process of the matching unit 202-2 of FIG. 2. The classification character string pattern 201-4 complying with the character string generation rule of the system may be generated.

The balance inquiry process or the account activity inquiry may be performed in the Internet banking. The process may include a type of operation on a business system that calls an input sentence as a name identification target.

Figure 6:
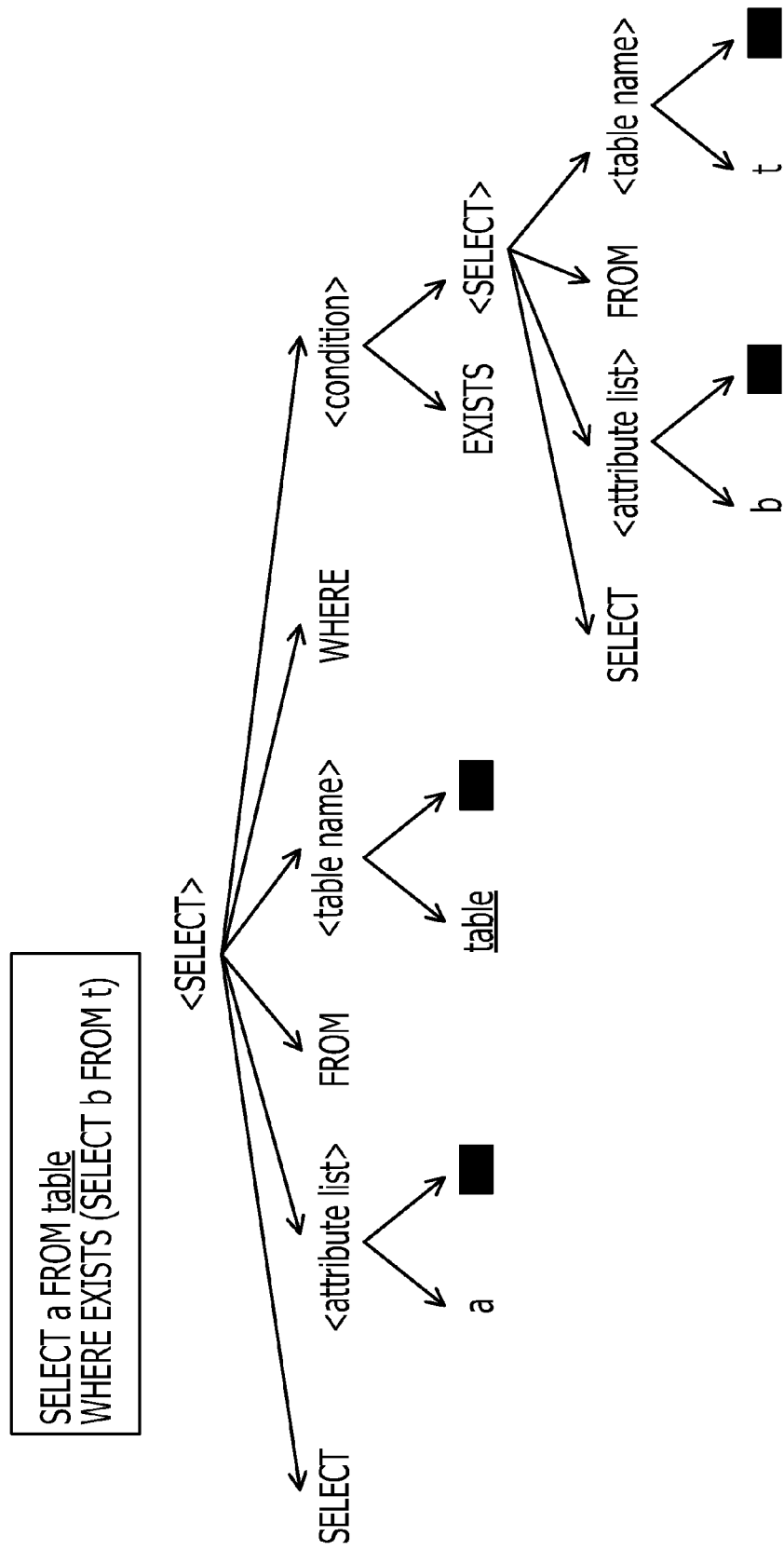
FIG. 6 illustrates an exemplary parse tree.
Figure 7:
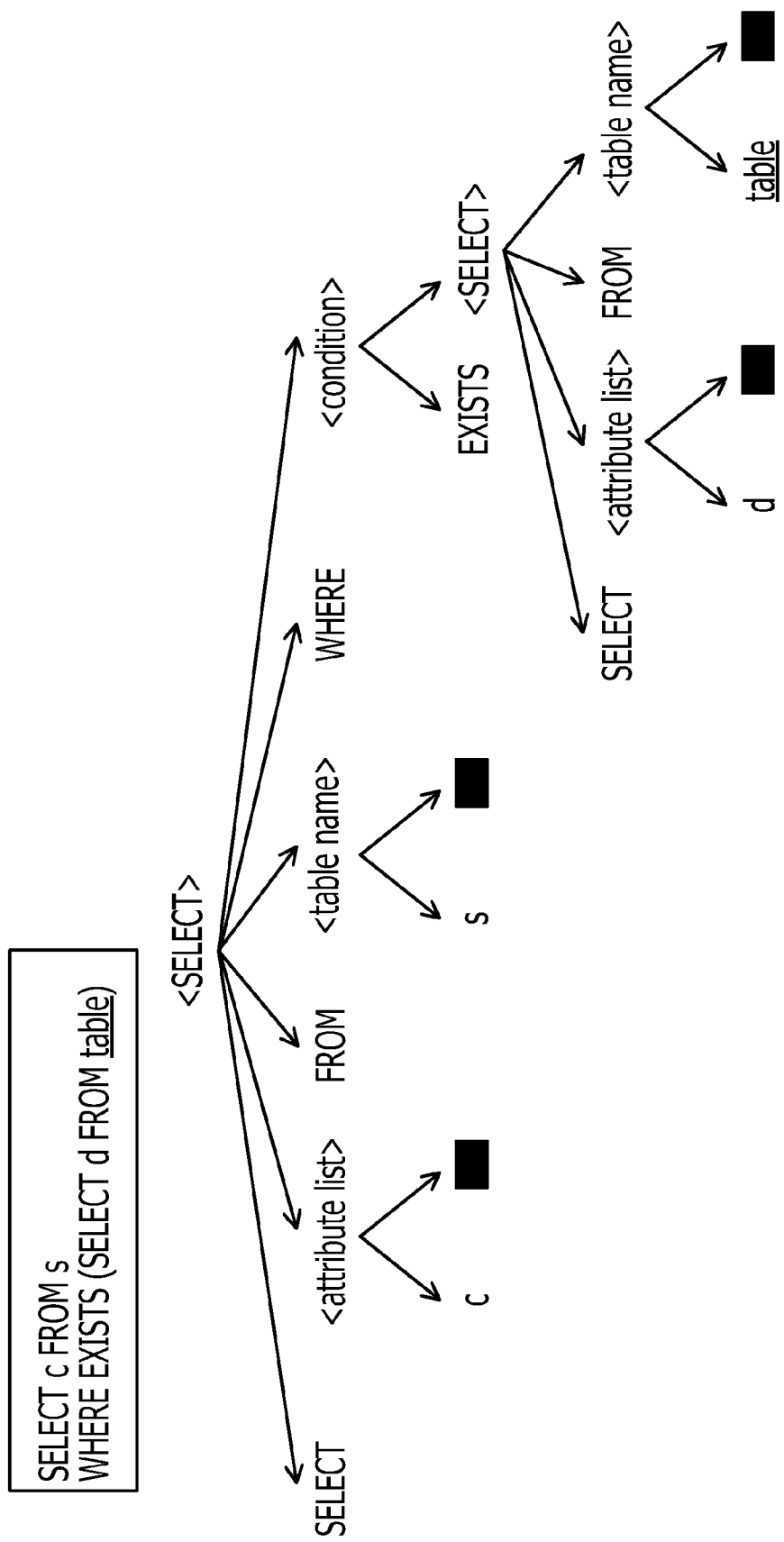
FIG. 7 illustrates an exemplary parse tree.

A particular word may not appear on different locations of the abstract syntax trees having a similar meaning to the word. FIG. 6 and FIG. 7 illustrate an exemplary abstract syntax tree. FIG. 6 illustrates an abstract syntax tree resulting from parsing the following SQL sentence (5).

SELECT a FROM table WHERE EXISTS (SELECT b FROM t)(5)

A character string "<SELECT>" is mapped to the root node of a first layer. The node including a character string enclosed by "<" and ">" is a nonterminal symbol, and indicates that the node has a node at lower layer coupled thereto. Six nodes at a second layer from left to right, which are connected under the node corresponding to the nonterminal character string "<SELECT>" correspond to character strings "SELECT", "<attribute list>", "FROM", "<table name>", "WHERE", and "<condition>", respectively. The character string "SELECT" is a terminal symbol that indicates a keyword in the SQL grammar to retrieve record data from a table of a database. The character string "<attribute list>" is a nonterminal symbol that indicates that a leaf node indicating a character string in a list of item names of a table retrieved by a SELECT sentence is mapped. The character string "FROM" is a terminal symbol that indicates a keyword in the SQL grammar to specify a table as a reference destination. The character string "<table name>" is a nonterminal symbol that indicates that a leaf node indicating a character string of a table name as the reference destination is mapped. The character string "WHERE" is a terminal symbol that indicates a keyword in the SQL grammar specifying a search condition. The character string "<condition>" is a nonterminal symbol that indicates that a node indicating a character string of a content of the search condition as the reference destination is mapped. One leaf node at a third layer connected under a node corresponding to the character string "<attribute list>" at the second layer is mapped to a character string "a" as a terminal symbol indicating a table item name. One leaf node at the third layer coupled under the node corresponding to the character string "<table name>" at the second layer is mapped to a character string "table" of the terminal symbol indicating the table name. Two nodes at the third layer connected under the node corresponding to the character string "<condition>" at the second layer are respectively mapped to a character string "EXISTS" of a terminal symbol indicating the content of the search condition and a character string "<SELECT>" of a nonterminal symbol. Four nodes from left to right at a fourth layer connected under the node corresponding to the character string "<SELECT>" at the third layer are respectively mapped to the character strings "SELECT", "<attribute list>", "FROM", and "<table name>". One leaf node at a fifth layer coupled to under the node corresponding to the character string "<attribute list>" at the fourth layer is mapped to a character string "b" of a terminal symbol indicating the table item name. One leaf node at the fifth layer coupled under the node corresponding to the character string "<table name>" at the fourth layer is mapped to a character string "t" of a terminal symbol indicating the table name.

FIG. 7 illustrates a parse tree that results from parsing the following SQL sentence (6).

SELECT c FROM s WHERE EXISTS (SELECT d FROM table)(6)

In comparison with the SQL sentence (5) of FIG. 6, a table name "table" appears at a location different in terms of the SQL grammar in the SQL sentence (6). For example, the table name "table" is specified in the "FROM" phrase in the SQL sentence (5) while the table name "table" is specified in the "FROM" phrase within the "EXISTS" phrase in the SQL sentence (6). In the parse tree of FIG. 7, the character string "<SELECT>" of a nonterminal symbol is mapped to the root node at a first layer. Six nodes from left to right at a second layer coupled under the node corresponding to the character string "<SELECT>" are mapped to character strings "SELECT", "<attribute list>", "FROM", "<table name>", "WHERE", and "<condition>", respectively. The meaning of each character string may be substantially identical to the meaning of each character string of FIG. 6. One node at a third layer coupled under the node corresponding to the character string "<attribute list>" of the nonterminal symbol at the second layer is mapped to a character string "c" of a terminal symbol indicating a table name. One node at the third layer coupled under the node corresponding to the character string "<table name>" at the second layer is mapped to a character string "s" indicating a table name. Two nodes at the third layer coupled under the node corresponding to the character string "<condition>" of the nonterminal symbol at the second layer are mapped to a character string "EXISTS" of a terminal symbol indicating the content of a search condition, and a character string "<SELECT>" of a nonterminal symbol. Four nodes from left to right at a fourth layer coupled under the node corresponding to the character string "<SELECT>" of the nonterminal symbol at the third layer are respectively mapped to character strings "SELECT", "<attribute list>", "FROM", and "<table name>". One leaf node at a fifth layer coupled under the node corresponding to the character string "<attribute list>" of the nonterminal symbol at the fourth layer is mapped to a character string "d" of a terminal symbol indicating a table item name. One node at the fifth layer coupled under the leaf node corresponding to the character string "<table name>" at the fourth layer is mapped to a character string "table" of a terminal symbol indicating a table name.

In comparison of the SQL sentence (5) of FIG. 6 with the SQL sentence (6) of FIG. 7, the same table name "table" appears in locations different in terms of the SQL grammar. The input sentences may be sentences that the system generates using only different parameters. In the groups of types of substantially the same process, the table name "table" having the same meaning may not be described in different forms as illustrated in the SQL sentence (5) and the SQL sentence (6).

The processes having substantially the same meaning may not be expressed in different sentences by adding parentheses. This may be because the system generates the sentences with only parameters changed.

Figure 8A:
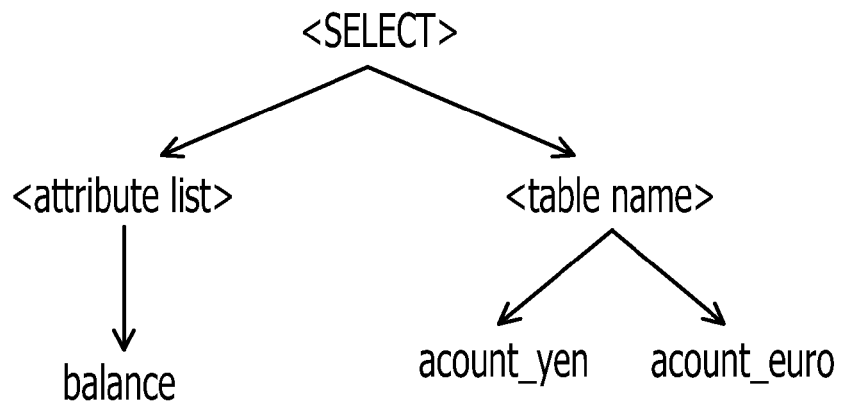
FIGS. 8A and 8B illustrate an exemplary parse tree.
Figure 8B:
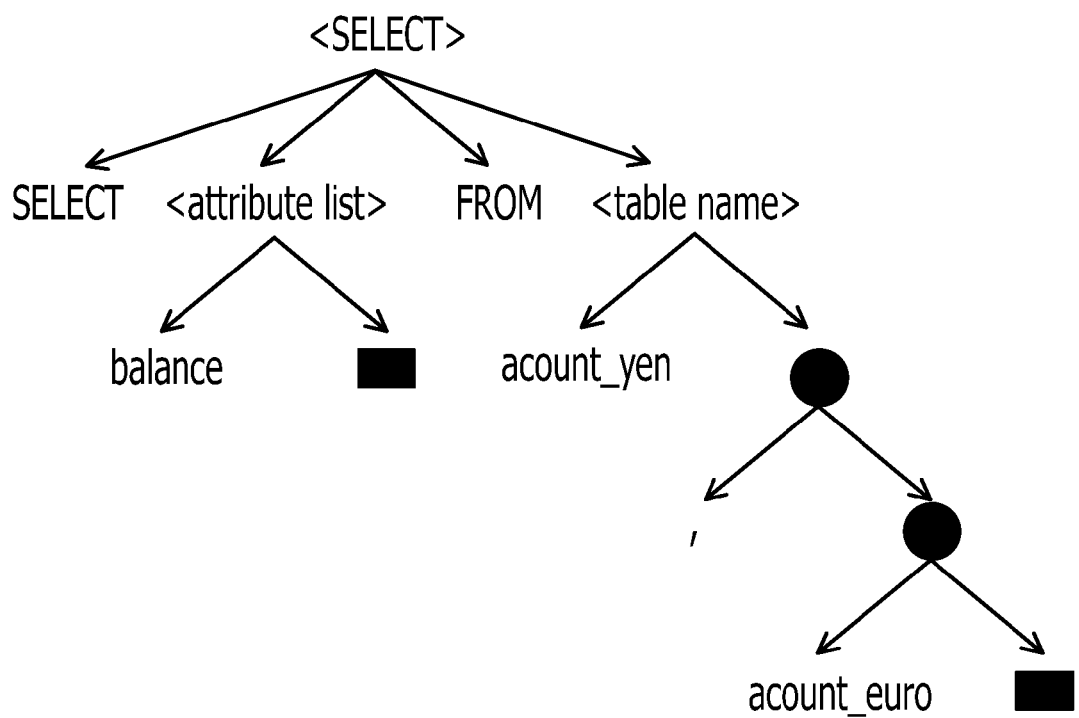

For example, the abstract syntax tree generating unit 201-2 of FIG. 2 parses all the input sentences and generates the abstract syntax trees. FIGS. 8A and 8B illustrate an exemplary abstract syntax tree. A portion unrelated to the program and a particular keyword for use in the programming are omitted from the parse tree to generate the abstract syntax tree. For example, omitted may include parentheses, "SELECT", "DELETE", "UPDATE", "FROM", "WHERE", "ORDER BY", and "EXIST". Since delineation by parentheses is not performed in the tree structure, parentheses in the parse tree may be omitted. Referring to FIG. 8A, an input sentence (7) of the context-free language is parsed.

SELECT balance FROM account_yen, account_euro(7)

A new node is generated for each grammatical rule, and a leaf is mapped to a symbol of the rule. A portion such as a grouping rule unrelated to the meaning of the process (program) may be neglected.

A parse tree of FIG. 8B may result through parsing on the SQL sentence (7). The removal of a redundant portion from the parse tree of FIG. 8B results in the abstract syntax tree of FIG. 8A.

In the abstract syntax tree of FIG. 8B, the root node at a first layer is mapped to a character string "<SELECT>" of a nonterminal symbol. Four nodes from left to right at a second layer coupled under the node corresponding to the character string "<SELECT>" of the nonterminal symbol are the character strings "SELECT", "<attribute list>", "FROM", and "<table name>", respectively. One leaf node at a third layer coupled under the node corresponding to the character string "<attribute list>" at the second layer is mapped to a character string "balance" of a terminal symbol indicating a table item name. One leaf node at the third layer coupled under the node corresponding to the character string "<table name>" at the second layer is mapped to a character string "account_yen" of a terminal symbol indicating one table name. A character string "account_euro" of a terminal symbol indicating one table name is mapped to a layer below the third layer.

In the abstract syntax tree of FIG. 8A, the root node at the first layer is mapped to a character string "<SELECT>" of the nonterminal symbol. The leaf node having the character string "SELECT" of the terminal symbol and the leaf node having the character string "FROM" of the terminal symbol, illustrated in FIG. 8B, are removed at the second layer connected under the node corresponding to the character string "<SELECT>" The node having the character string "<attribute list>" of the nonterminal symbol and the node having the character string "<table name>" of the nonterminal symbol remain at the second layer.

During the generation of the abstract syntax tree, each node corresponding to the table name "account_yen" or "account_euro" as each of the plurality of arguments, such as the table name of the FROM phrase in the SQL sentence (7), may be arranged at substantially the same layer. This may be intended to determine whether patterns, each having a plurality of arguments at substantially the same layer, are identical. During the generation of the abstract syntax tree, mapping between an event character string of an input sentence and an abstract syntax tree may be preserved.

The abstract syntax tree classification processor unit 401 illustrated in FIG. 4 classifies, to a certain depth, the abstract syntax trees obtained through parsing, into sets each set including the abstract syntax trees having identical nonterminal symbols of the nodes other than the leaf nodes and having identical terminal symbols of the leaf nodes. Terminal symbols of the leaf nodes may be different.

Figures 9A, 9B, 9C:
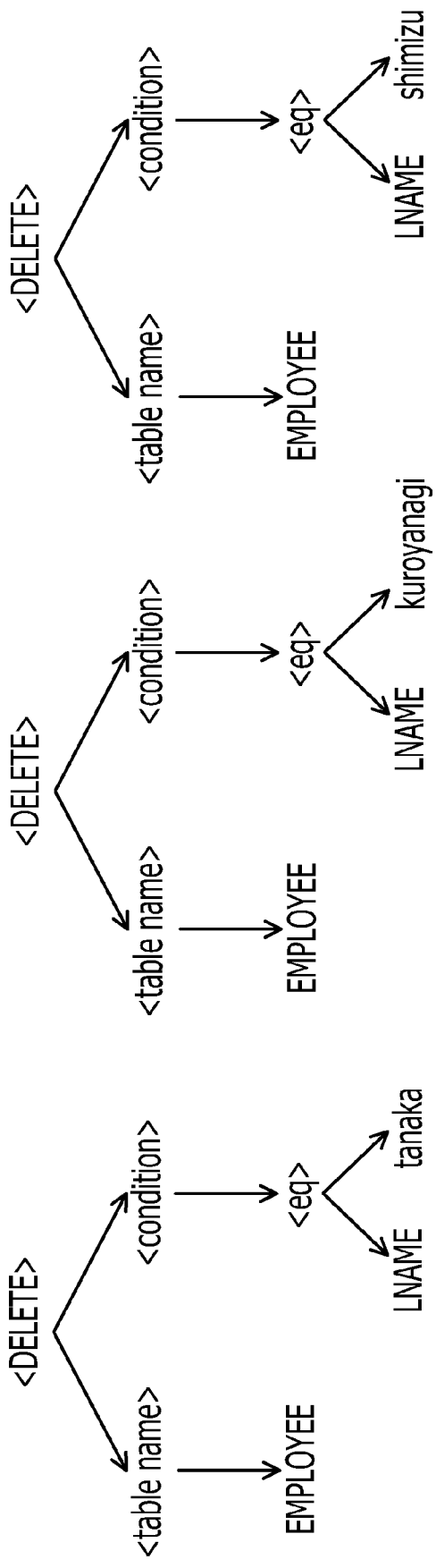
FIG. 9A-9C illustrate an exemplary parse tree.

FIGS. 9A-9C illustrate an exemplary abstract syntax tree. The abstract syntax tree of FIG. 9A is generated from an SQL sentence (8).

DELETE EMPLOYEE WHERE LNAME=tanaka(8)

In the abstract syntax tree of FIG. 9A, the root node at a first layer is mapped to a character string "<DELETE>" of a nonterminal symbol. Two nodes at a second layer coupled under the node corresponding to the character string "<DELETE>" of the nonterminal symbol are mapped to a character string "<table name>" of a nonterminal symbol and a character string "<condition>" of a nonterminal symbol, respectively. A leaf node at a third layer coupled under the node corresponding to the character string "<table name>" at the second layer is mapped to a character string "EMPLOYEE" of a terminal symbol indicating a table item name. One node at the third layer coupled under the node corresponding to the character string "<condition>" at the second layer is mapped to a character string "<eq>" of a nonterminal symbol. Two nodes at a fourth layer coupled under the node corresponding to the character string "<eq>" at the third layer are mapped to a character string "LNAME" of a terminal symbol and a character string "tanaka" of a terminal symbol, respectively. The abstract syntax tree of FIG. 9A is modified into the abstract syntax tree of FIG. 9B where the character string "tanaka" is replaced with a character string "kuroyanagi" of a terminal symbol at the fourth layer. The rest of the abstract syntax tree of FIG. 9B may be substantially identical to the abstract syntax tree of FIG. 9A. The abstract syntax tree of FIG. 9A is modified into the abstract syntax tree of FIG. 9C where the character string "tanaka" is replaced with a character string "shimizu" of a terminal symbol at the fourth layer. The rest of the abstract syntax tree of FIG. 9C may be substantially identical to the abstract syntax tree of FIG. 9A. If viewed from the first layer of the root node in the abstract syntax trees of FIGS. 9A through 9C, the abstract syntax trees are identical to each other in terms of the character string "<table name>" of the nonterminal symbol and the character string "<condition>" of the nonterminal symbol. The three abstract syntax trees are thus classified into one set.

If a condition or a name of a table mapped to a node in one abstract syntax tree is partially identical to that of another abstract syntax tree, the abstract syntax trees may or may not be considered to be identical.

The abstract syntax tree counting processor unit 402 illustrated in FIG. 4 lists a portion of a character string corresponding to a node in a common portion of an abstract syntax tree where the number of types of terminal symbols appearing on the node, from among the nodes where the terminal symbols appear in the set of classified abstract syntax trees, is equal to or lower than a specific multiple of the number of types of processes. The abstract syntax tree counting processor unit 402 counts the number of types of the abstract syntax trees with nodes other than the nodes in the common portion removed.

The nodes where the terminal symbol of the three abstract syntax trees classified in the same one set as illustrated in FIGS. 9A through 9C appears include the node at the third layer corresponding to the character string "EMPLOYEE" of the terminal symbol of one type, the node at the fourth layer corresponding to the character string "LNAME" of the terminal symbol of one type, and the nodes at the fourth layer corresponding to the character strings "tanaka", "kuroyanagi", and "shimizu" of the terminal symbols of three types.

For example, when the number of types of processes is 1 and a specific multiple number is 1, (the number of processes of the terminal symbols)×(specific multiple number)=nodes of one type, node "EMPLOYEE" and node "LNAME" are listed from among the nodes where a terminal symbol appears. The nodes other than these two nodes are removed, and the types of the resulting abstract syntax trees are counted. The count result may be one type.

If the count value is equal to or higher than the upper limit threshold value, the nodes are removed in the order from more to less types of terminal symbols so that the count value becomes lower than the upper limit threshold value. This operation may be performed by the counting result count adjusting unit 403 of FIG. 4.

When the count value may be excessively reduced until the number of types of the abstract syntax trees is smaller than the lower limit threshold value and may become 1, for example, when all the abstract syntax trees are considered to be identical, the classification operation is repeated to a deeper layer. This operation is performed by the layer depth control unit 404 of FIG. 4.

If the count value becomes an appropriate value, a character string pattern with a character string corresponding to the node in the common portion, which is not removed from the input sentence corresponding to the abstract syntax tree included in the set, is generated as a classification character string pattern. This operation may be performed by the classification character string pattern output unit 405 of FIG. 4.

Figures 10A, 10B:
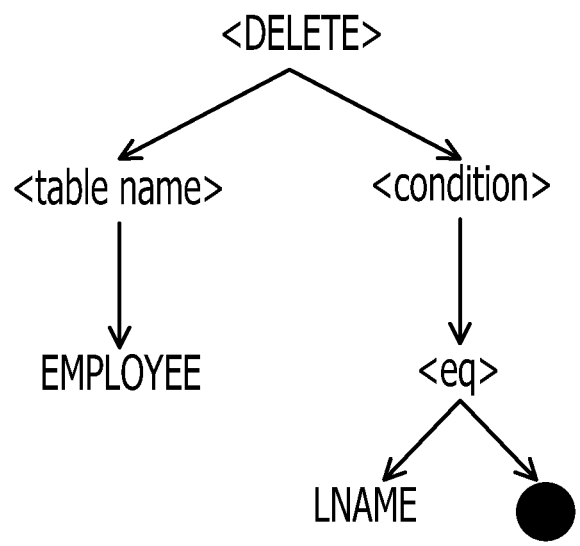
FIGS. 10A and 10B illustrate an exemplary conversion rule.

FIGS. 10A and 10B illustrate an exemplary conversion rule. The conversion rule of FIG. 10A may be a conversion rule for name identification, for example, may be a classification character string pattern for classifying each input sentence. The counting operation may be performed on the set of FIGS. 9A through 9C, and the classification character string pattern of FIG. 10A may result. A solid dot denotes the node removed in the counting operation. For example, the node "EMPLOYEE" and the node "LNAME" may be left remaining. The classification character string pattern illustrated in FIG. 10B, where a character string portion corresponding to the node to be removed is represented in regular expression, and the classification character string pattern described below are generated in accordance with the SQL sentence (8).

DELETE EMPLOYEE WHERE LNAME=.*(8)

Here "." following "LNAME" indicates that any one character is specifiable. The symbol "*" indicates that any one immediately preceding character is permitted to be repeated.

Since sentences having the same meaning are not presumed to be in different forms, input sentences corresponding to the abstract syntax trees having the same meaning may be set to be substantially identical.

Figure 11A:
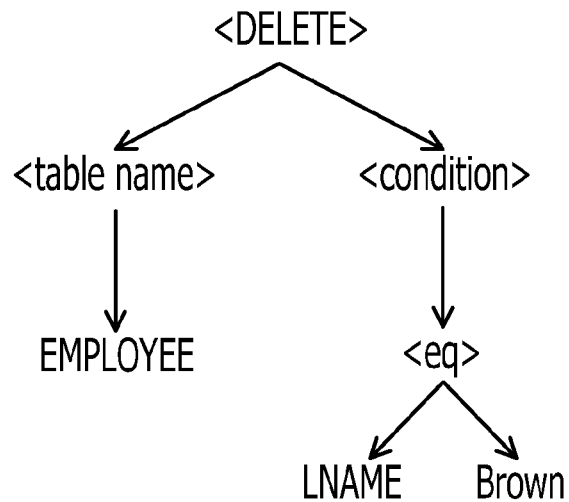
FIGS. 11A and 11B illustrate an exemplary abstract syntax tree.
Figure 11B:
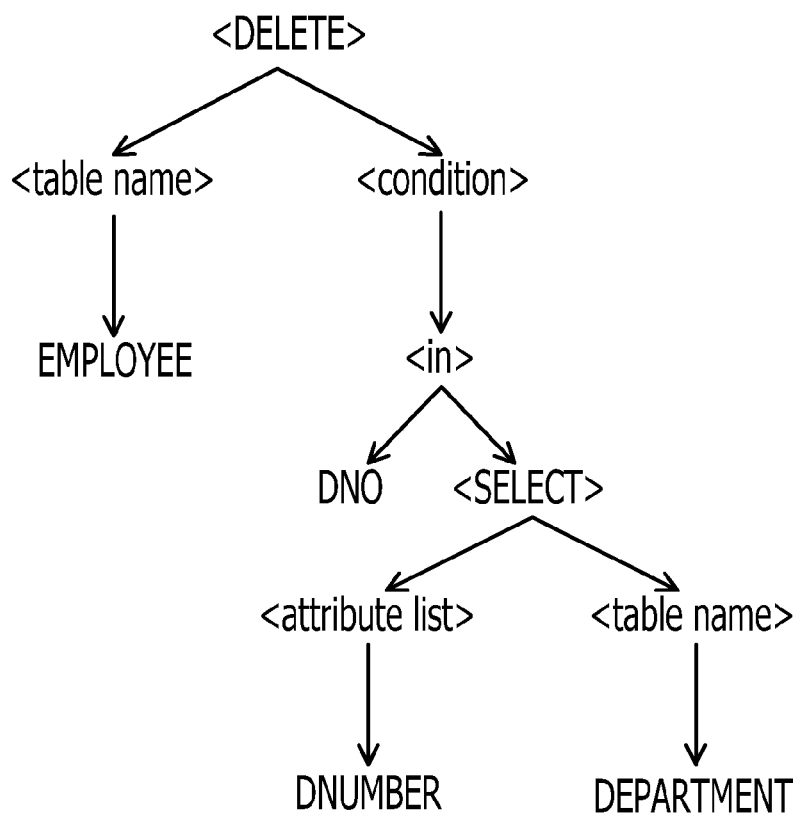

FIGS. 11A and 11B illustrate an exemplary abstract syntax tree. The relationship between the depths of the abstract syntax trees and identity in shapes of the abstract syntax trees is illustrated in FIGS. 11A and 11B. When the abstract syntax trees are classified into sets, the abstract syntax trees having substantially identical nonterminal symbols of the nodes other than the leaf nodes from the first layer corresponding to the root node to the depth of a specific layer are grouped in a set. For example, as illustrated in FIGS. 11A and 11B, the two abstract syntax trees are identical to each other down to the second layer in terms of a character string "<table name>" of a nonterminal symbol of a node other than a leaf node and a character string "<condition>" of a nonterminal symbol of a node other than a leaf node. The two abstract syntax trees are thus set to be identical in shape. At the third layer, the two abstract syntax trees are not substantially identical to each other because the character strings of the nonterminal symbols of the nodes other than the leaf nodes are "<eq>" in one abstract syntax tree and "<in>" in the other abstract syntax tree. The two abstract syntax trees are thus set to be different in shape. The abstract syntax trees substantially identical in the nonterminal symbol of the nodes other than the leaf nodes from the first layer corresponding to the root node down to the depth of the specific layer may be grouped in the same one set and characteristics of the classification character string pattern may be thus determined.

A determination criterion for extracting nodes in the common portion from the abstract syntax trees may include the number of types of character strings equal to or smaller than a certain multiple of the number of processes having called the input sentence.

For example, in a plurality of events, one event may be caused by another event. The event causing another event may be referred to as a parent event, and the event caused by another event may be referred to as a child event. For example, a request event, which is a type of process (business operation type) a request to transfer money, may be transmitted from a user server to an application server. The application server having received the request event may issue an event of an SQL sentence specifying the process of the money transfer to a data-base server. In this case, the request event to request the money transfer may be referred to as a parent event, and the event of the SQL sentence may be referred to as a child event.

Two events may be e (parent) and f (child). Attributes of the events may be $a1(e)$, $a1(f)$, $a2(e)$, $a2(f)$, . . . may satisfy relationships $a1(e)$ R1 $a1(f)$, $a2(e)$ R2 $a2(f)$, . . . . If any two events g and h satisfy $a1(g)$ R1 $a1(h)$, $a2(g)$ R2 $a2(h)$, . . . , g may be referred to as a parent candidate of h (h may be referred to as a child candidate of g).

System visualization example: R1, R2 attributes;
Combination of event start time and event end time: <s1, e1>R1<s2, e2>≡
s1<s2∧ e2<e1

The symbol "∧" means "and". The symbol "≡" means that the definition of the right-hand side of ≡ is described on the left-hand side of ≡. Attribute: an event is a character string transmitted from location p to location q. Here p and q relationship is <p1, q1>R2<p2, q2>≡q1=p2.

A parent candidate may be listed for the character string of each event. When visualization is performed, the parent candidate is determined based on inclusion relationship of the start time and the end time. Each parent candidate is extracted for the character strings of the events of the same type, the frequency of occurrence is calculated in the order from high frequency to low frequency, and a candidate number covering 90% of all the types is set.

For example, a character string group of parent candidates of the character strings of the same form of sentences, s1, s2, s3, s4, and s5, are set to $\{H1_1, H2_1\}$, $\{H1_2, H3_1, H4_1\}$, $\{H1_2, H2_2\}$, $\{H1_1, H5_1\}$, and $\{H2_3, H3_2\}$. H1 of $H1_2$ indicates the type of event. The subscript means an identification (ID) of the event. For example, $H1_1$ and $H1_2$ are character strings of events that are different but of the same type. The set S of the parent candidates may be $S=\{H2_1, H2_2, H2_3\} \cup \{H1_1, H1_2\} \cup \{H3_1, H3_2\} \cup \{H4_1\} \cup \{H5_1\}$. If the subscripts are deleted from the set S of the parent candidates and the set S is rearranged in the order of frequency, H2, H2, H2, H1, H1, H3, H3, H4, and H5 may result. Ninety percent of all nine candidates are extracted, and four types of H1, H2, H3, and H4 may be determined as the number of types of parent candidates.

Figure 12A:
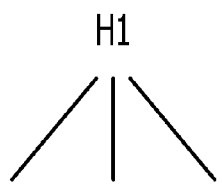
FIGS. 12A-12F illustrate an exemplary type count of parent candidate.
Figure 12B:
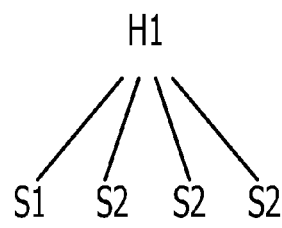
Figure 12C:
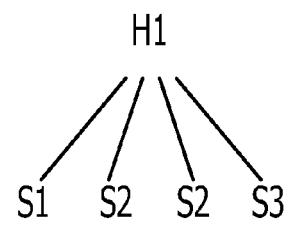
Figure 12D:
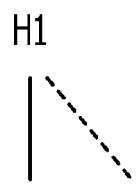
Figure 12E:
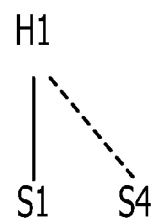
Figure 12F:
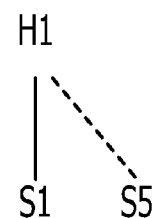

Modeling is performed through a modeling technique, thereby establishing parent-child relationship. The modeling technique may be one of related-art techniques. FIGS. 12A through 12F illustrate an exemplary number of types of parent candidates. FIGS. 12A through 12C illustrate patterns of parent-child relationship between a character string H1 of a parent event and character strings S1, S2, and S3 of child events. The modeling technique may establish from the patterns of FIGS. 12A through 12C a model of FIG. 12D where "a parent-child relationship of H1 and S1 is established with any relationship permitted on other child events". A character string as a new event may be input, like S4 of FIG. 12E, or S5 of FIG. 12F. The parent-child relationship that "the parent candidate of event S4 or S5 is H1" may be calculated with the model of FIG. 12D applied. An erroneous name identification may be absorbed by a parent-child relationship that has been established based on the model of FIG. 12D covering a wider range, and a single parent candidate may be set.

Figure 13:
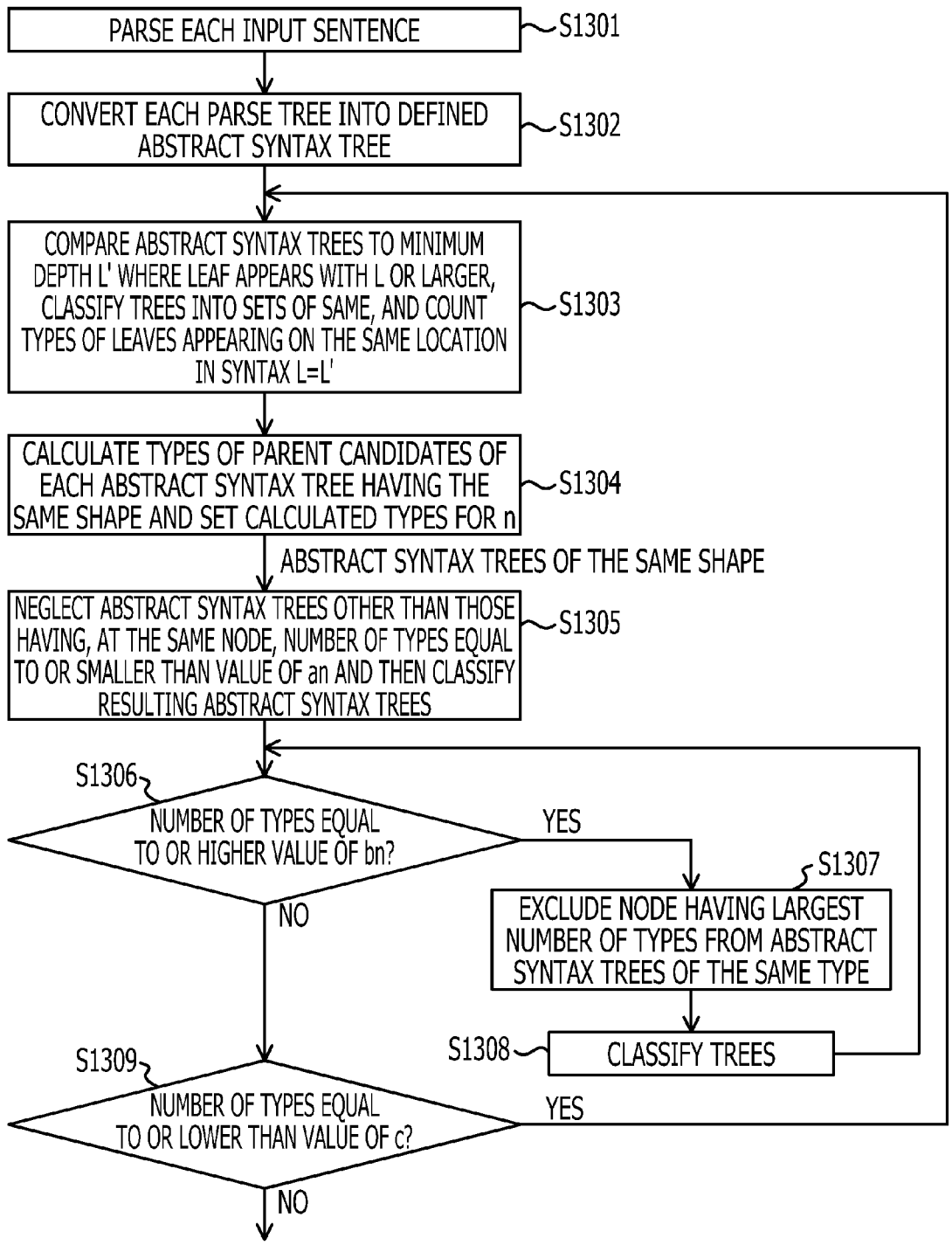
FIG. 13 illustrates an exemplary control process of a modeling apparatus.

FIG. 13 illustrates an exemplary control process of a modeling apparatus. The modeling apparatus 201 illustrated in FIGS. 2 and 4 may perform the control process of FIG. 13. The control process of FIG. 13 may correspond to a process of a control program stored on a memory 1702 or the like and executed by a CPU 1701 in a computer of FIG. 17.

In the control process, a variable "n" is the number of types of processes (operation types), and "a", "b", and "c" may be positive constants, and relationship b≥a may hold. A value an (a×n) may be a threshold value that is defined as a specific multiple number of the number of types of processes corresponding to determination criteria where a node in the common portion of the abstract syntax tree is extracted. A value bn (b×n) may be the upper limit threshold value of the count value and c may be the lower limit threshold value of the count value. A variable L that controls the number of specific layers may have an initial value of zero.

In an operation S1301 of FIG. 13, each input sentence is parsed. In an operation S1302 of FIG. 13, a portion unrelated to the meaning of the process is removed from each parse tree. Nodes, each of which is likely to take a plurality of arguments, is arranged substantially at the same layer and the abstract syntax tree corresponding to each input sentence is generated. This process may correspond to the function of the abstract syntax tree generating unit 201-2 of FIG. 2. For example, three types of abstract syntax trees of FIGS. 9A through 9C may be generated from three input sentences.

Figure 14:
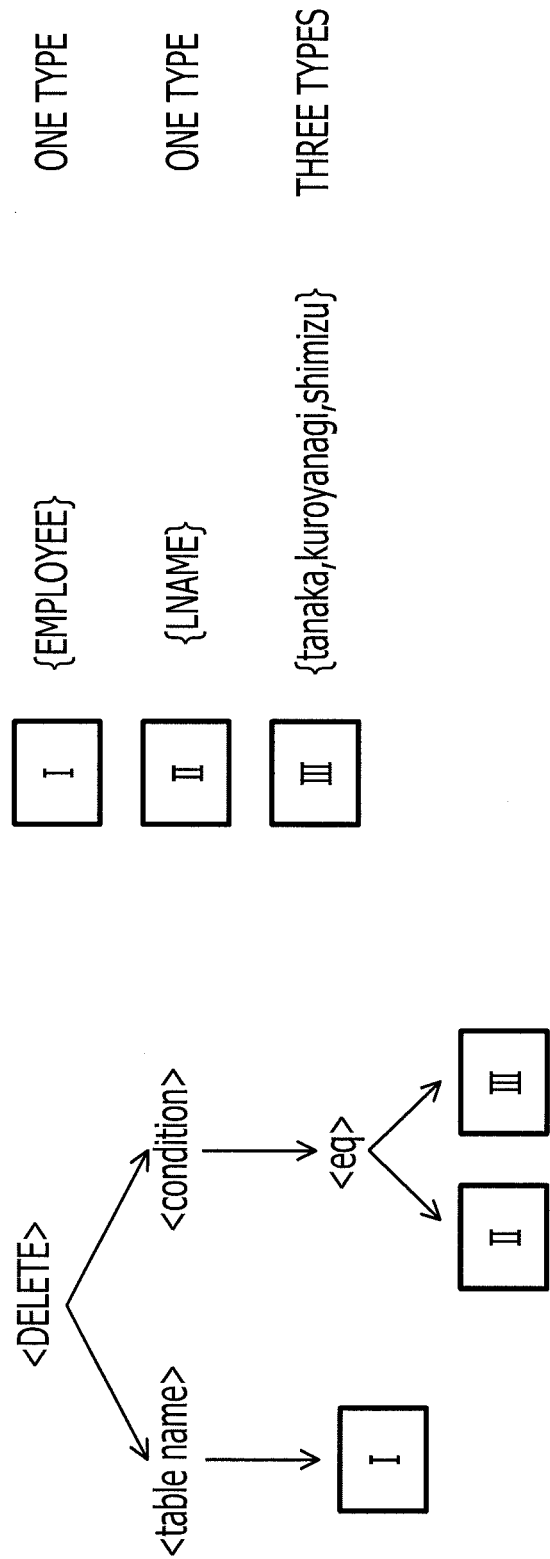
FIG. 14 illustrates an exemplary terminal symbol.

The depth of a minimum depth layer (specific layer) of the abstract syntax tree where a leaf node appears with more or equal to the variable L (having an initial value of zero) may be set to be L'. Since the leaf node corresponding to the character string "EMPLOYEE" of the terminal symbol appears first as illustrated in FIGS. 9A through 9C, L'=3 may hold. In an operation S1303 of FIG. 13, the abstract syntax trees are compared to each other down to the layer L' and classified into a set including abstract syntax trees having a substantially identical shape. The three abstract syntax trees illustrated in FIGS. 9A through 9C have the substantially identical character string "<eq>" of the nonterminal symbol at the third layer. For this reason, the three abstract syntax trees may be classified into one set. The number of types of terminal symbols is counted at each leaf node in the set of the classified abstract syntax trees where the terminal symbol appears. FIG. 14 illustrates an exemplary terminal symbol. In the abstract syntax trees of FIGS. 9A through 9C, nodes I corresponding to the character string "EMPLOYEE" of the terminal symbol may be one type as illustrated in FIG. 14. Nodes II corresponding to the character string "LNAME" of the terminal symbol may be one type. Nodes III corresponding to the character strings "tanaka, kuroyanagi, shimizu" of the terminal symbols may be three types. The value of a current specific layer count L' is set for a specific layer count control variable L. The above process may correspond to the function of the abstract syntax tree classification processor unit 401 and part of the function of the abstract syntax tree counting processor unit 402 of FIG. 4 within the classification character string pattern generating unit 201-3 of FIG. 2.

In an operation S1304 of FIG. 13, the type of parent candidate may be derived from the set of abstract syntax trees in the same shape classified in the operation S1303 to set the variable n. The number of types of processes (operation types) n may be calculated through a first calculation method or a second calculation method of the number of types of parent candidates.

Figure 15A:
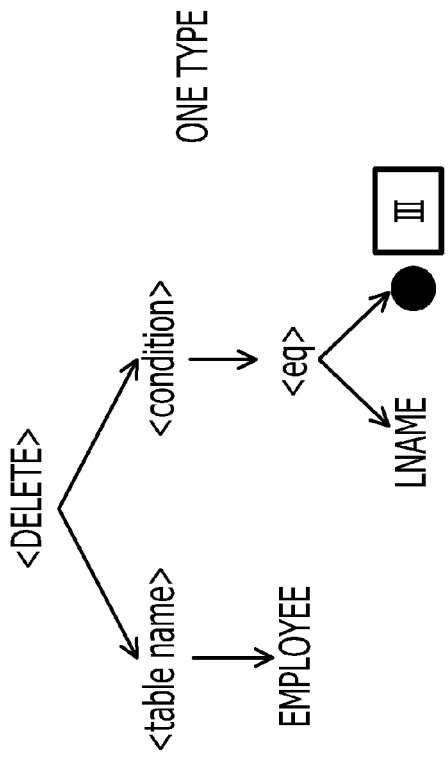
FIGS. 15A and 15B illustrate an exemplary abstract syntax tree.
Figure 15B:
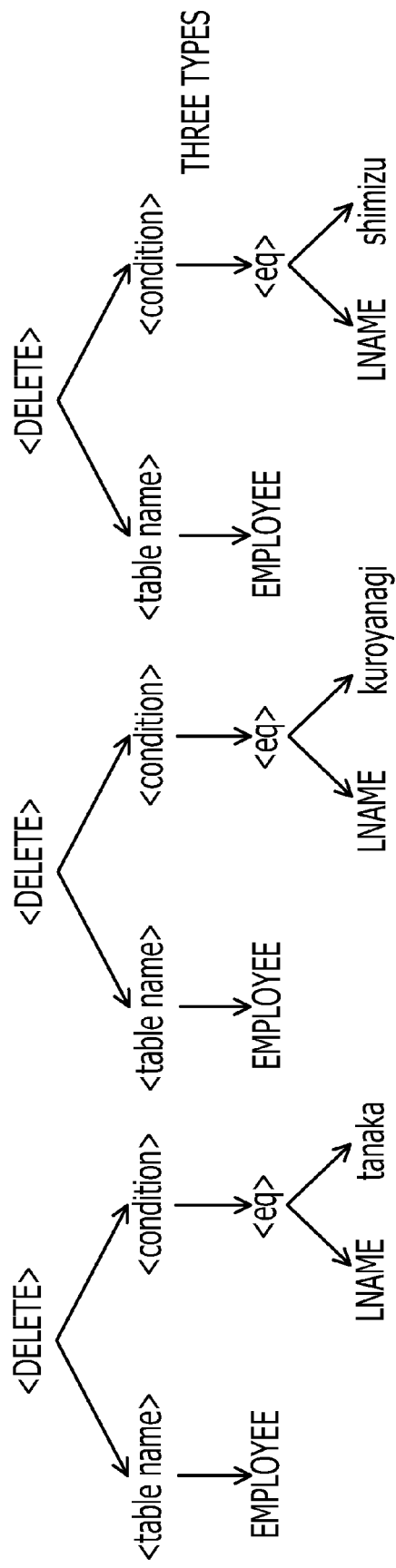

In an operation S1305 of FIG. 13, in the set of the classified abstract syntax trees in the operation S1303, leaf nodes of terminal symbols, other than the nodes with the number of types equal to or lower than "an", are excluded, and the abstract syntax trees are classified, and the types are counted. For example, if the number of types of processes n is 1 with a constant "a" being 1, the value of "an" may be 1. Thus, the nodes III of FIG. 14 may be removed, and the nodes I and II may be counted. FIGS. 15A and 15B illustrate an exemplary abstract syntax tree. As illustrated in FIG. 15A, the number of the abstract syntax trees may become one through removal. For example, if the number of types of processes n is 4 with the constant "a" being 1, the value of "an" may be 4. The nodes I, II, and III of FIG. 14 may be counted and no node may be removed. As illustrated in FIG. 15B, the number of types of abstract syntax trees may be three. The above-described process may correspond to part of the function of the abstract syntax tree counting processor unit 402 of FIG. 4 within the classification character string pattern generating unit 201-3 of FIG. 2.

It is determined in an operation S1306 whether the number of types of abstract syntax trees counted in the operation S1305 of FIG. 13 is equal to or higher than the upper limit threshold value bn. The operation S1306 may correspond to part of the function of the counting result count adjusting unit 403 of FIG. 4 within the classification character string pattern generating unit 201-3 of FIG. 2.

If it is determined that the number of types of abstract syntax trees counted is equal to or higher than the upper limit threshold value bn (yes in determination of the operation S1306), an operation S1307 is performed. A node having the largest number of terminal symbols is removed from the set of the abstract syntax trees currently being processed, and the types of abstract syntax trees are counted again. If the value of "an"=4, the nodes I, II, and III are counted, and the number of types of abstract syntax trees=3. If the variable "b" is 1 in FIG. 15B, the number of types of abstract syntax trees=3 causes the value of "bn" to be 3 or higher. In the operation S1307, the node III (FIG. 14) including the largest number of types of terminal symbols, i.e., 3 types, is removed from the set of abstract syntax trees illustrated in FIG. 15B. The types of the abstract syntax trees counted are classified again and counted (form the operation S1307 to an operation S1308 in FIG. 13). It is then determined whether the number of types is larger than the upper limit threshold value "bn" (form the operation S1308 and to the operation S1306 in FIG. 13). For example, if the nodes III are removed, the types of abstract syntax tree become one as illustrated in FIG. 15A, and the determination in the operation S1306 becomes no. The above-described process may correspond to part of the function of the counting result count adjusting unit 403 of FIG. 4 within the classification character string pattern generating unit 201-3 of FIG. 2.

If the number of types the abstract syntax trees counted becomes equal to or smaller than the upper limit threshold value and the determination in the operation S1306 is no, it is then determined whether the number of types of the abstract syntax trees counted is smaller than the lower limit threshold value "c" (the operation S1309 in FIG. 13). The process here may correspond to part of the function of the layer depth control unit 404 of FIG. 4 within the classification character string pattern generating unit 201-3 of FIG. 2.

If the number of types of abstract syntax trees counted becomes lower than the lower limit threshold value and reaches one, i.e., all the abstract syntax trees become identical to each other, the determination in an operation S1309 becomes yes. A process may return to the operation S1303 and the classification process may be performed to a deeper layer in the parse trees. For example, the depth of a minimum depth layer (specific layer) of the abstract syntax tree where a leaf node appears with equal to or larger than the variable L, for example, 3, may be set to be L'. The process here may correspond to part of the function of the layer depth control unit 404 of FIG. 4 within the classification character string pattern generating unit 201-3 of FIG. 2.

FIGS. 16A through 16D illustrate an exemplary output classification character string pattern. If the determination in the operation S1309 is no, the counting process results in a tree having the classification character string pattern of FIG. 16B from the abstract syntax tree of FIG. 16A. A solid dot denotes the node to be removed in the counting operation. For example, a classification character string pattern DELETE EMPLOYEE WHERE .* (10) of FIG. 16D where the character string corresponding to the node to be removed is described in regular expression is generated based on the remaining node "EMPLOYEE", the original sentence corresponding to the abstract syntax tree of FIG. 16C (the original SQL sentence), and DELETE EMPLOYEE WHERE LNAME=Brown (9). Here the symbol "." following "LNAME" denotes a regular expression matching any one character, and the symbol "*" denotes a regular expression matching a repeat of any one immediately preceding character. How these symbols function has been described with reference to FIG. 5. The remaining nodes may be one type of "EMPLOYEE". If a plurality of patterns remain, a plurality of classification character string patterns represented by equation (10) including the remaining patterns may be generated.

The pattern corresponding to the character string conversion rule for name identification is automatically extracted. Name identification may be performed simply through pattern matching without involving parsing.

Figure 17:
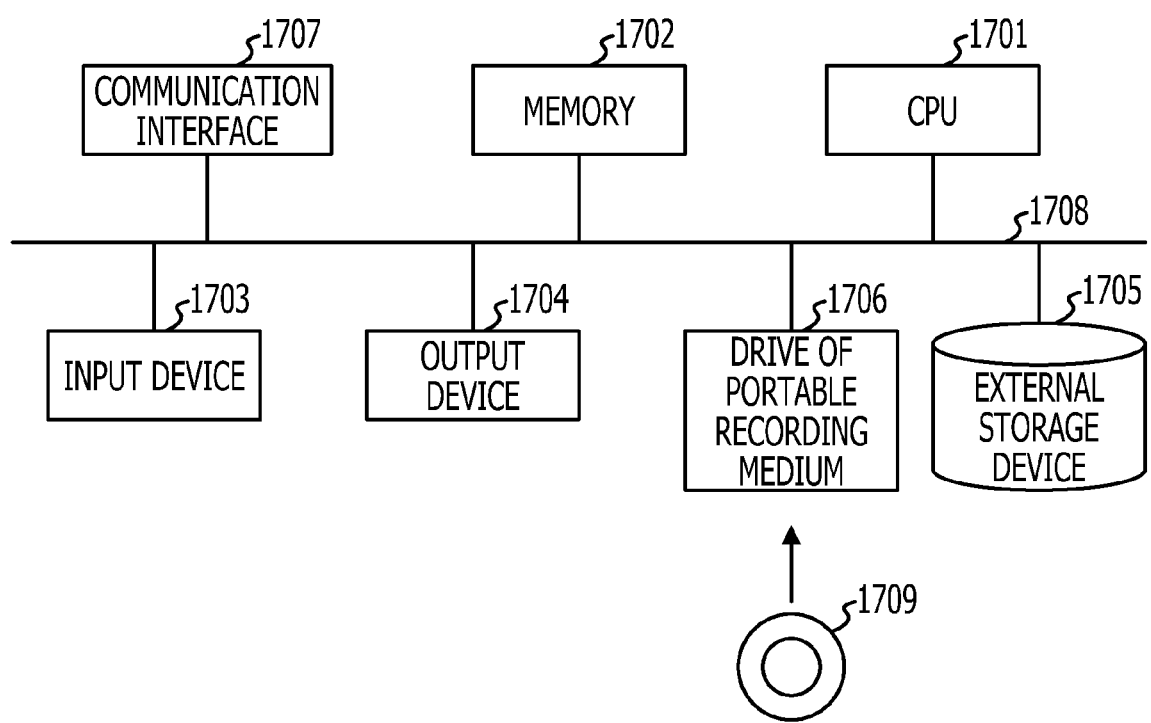
FIG. 17 illustrates an exemplary computer.

FIG. 17 illustrates an exemplary computer. The computer of FIG. 17 may execute the name identification using software. The computer of FIG. 17 includes elements interconnected via a bus 1708. The elements of the computer include central processing unit (CPU) 1701, memory 1702, input device 1703, output device 1704, external storage device 1705, portable recording medium drive 1706 having a portable recording medium 1709 loaded thereon, and communication interface 1707.

The CPU 1701 generally controls the computer. The memory 1702 temporarily stores a program or data, which are to be stored on the external storage device 1705, such as the portable recording medium 1709, when the program is executed or when the data are updated. The memory 1702 may be a random access memory (RAM), for example. The CPU 1701 controls the computer by reading the program onto the memory 1702 and executing the program.

The input device 1703 detects an input operation by a user on a keyboard or a mouse, and then notifies the CPU 1701 of detection results. Data transmitted under the control of the CPU 1701 are output to an external storage device such as a display device or a printer device.

The external storage device 1705 may be a hard disk storage device, and stores a variety of data or programs. The portable recording medium drive 1706 may receive the portable recording medium 1709, such as an optical disk, a synchronous dynamic random access memory (SDRAM), or a compact flash, and may serve as an auxiliary device for the external storage device 1705.

The communication interface 1707 may be a device through which the computer is connected to a communication line such as a local area network (LAN) or a wide-area network (WAN). In the system, the program including the function illustrated in FIG. 13 may be executed by the CPU 1701. The program may be recorded on one of the external storage device 1705 and the portable recording medium 1709 for distribution. The program may be retrieved from a network via the communication interface 1707.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A name identification rule generating method comprising:
   performing, by a computer, a detecting process to detect a first character string pattern which is used for identifying, from a plurality of input sentences corresponding to a plurality of requests which request to perform a plurality of processes, sentences which are rendered as the same with each other; and
   classifying the plurality of requests based on the first character string to perform a system process including the plurality of processes,
   wherein the detecting process includes operations of:
      generating each of a plurality of abstract syntax trees by removing a portion of each of the plurality of input sentences unrelated to each of the plurality of processes in analysis of syntax of the input sentences;
      setting, in generating the abstract syntax trees, nodes corresponding to a plurality of arguments at the same layer;
      classifying the abstract syntax trees into a set of first abstract syntax trees having substantially identical nonterminal symbols of nodes excluding leaf nodes from a first layer corresponding to a root node of the abstract syntax trees to a preceding layer of the leaf nodes;
      listing, as a first character string pattern, a first character string at first leaf nodes of the leaf nodes, a first number of types of terminal symbols at the first leaf nodes which are located at the same position in the set of first abstract syntax trees is equal to or smaller than a certain multiple of a number of types of the processes; and deleting, as the first character string pattern, a second character string at second leaf nodes of the leaf nodes, a second number of types of terminal symbols at the second leaf nodes which are located at the same position in the set of first abstract syntax trees is larger than the certain multiple of the number of types of the processes.

2. The name identification rule generating method according to claim 1, further comprising, classifying the input sentences in accordance with a classification character string pattern.

3. The name identification rule generating method according to claim 2, further comprising:

counting types of second abstract syntax trees obtained by removing the second leaf node;

adjusting a count value by removing a node having more types of the terminal symbols so that the count value becomes lower than an upper limit threshold value if the count value is equal to or higher than the upper limit threshold value; and repeating the counting and the adjusting by increasing a depth of the specific layer when the count value becomes lower than a lower limit threshold value.

4. The name identification rule generating method according to claim 3, further comprising, generating as the classification character string pattern a second character string pattern by leaving a character string corresponding to the first leaf node from the input sentence corresponding to the first abstract syntax tree included in the set if the count value is equal to or higher than the lower limit threshold value and lower than the upper limit threshold value.

5. A name identification rule generating apparatus comprising:

a processor configured to execute a name identification rule generating program of a detecting process to detect a first character string pattern which is used for identifying, from a plurality of input sentences corresponding to a plurality of requests which request to perform a plurality of processes, sentences which are rendered as the same with each other so that the plurality of requests are classified based on the first character string to perform a system process including the plurality of processes; and a memory, coupled to the processor, configured to store the name identification rule generating program, wherein the name identification rule generating program causes the processor to perform operations to:

generate each of a plurality of abstract syntax trees by removing a portion of each of the plurality of input sentences unrelated to each of the plurality of processes in analysis of syntax of the input sentence;

set, in the generation of the abstract syntax trees, nodes corresponding to a plurality of arguments at the same layer;

classify the abstract syntax trees into a set of first abstract syntax trees having substantially identical nonterminal symbols of nodes excluding leaf nodes from a first layer corresponding to a root node of the abstract syntax trees to a preceding layer of the leaf nodes;

list, as a first character string pattern, a first character string at first leaf nodes of the leaf nodes, a first number of types of terminal symbols at the first leaf nodes which are located at the same position in the set of first abstract syntax trees is equal to or smaller than a certain multiple of a number of types of the processes; and delete, as the first character string pattern, a second character string at second leaf nodes of the leaf nodes, a second number of types of terminal symbols at the second leaf nodes which are located at the same position in the set of first abstract syntax trees is larger than the certain multiple of the number of types of the processes.

6. The name identification rule generating apparatus according to claim 5, wherein the name identification rule generating program causes the processor to classify the input sentences in accordance with a classification character string pattern.

7. The name identification rule generating apparatus according to claim 6, wherein the name identification rule generating program causes the CPU processor to;

count types of second abstract syntax trees obtained by removing the second leaf node;

adjust a count value by removing a node having more types of the terminal symbols so that the count value becomes lower than an upper limit threshold value if the count value is equal to or higher than the upper limit threshold value; and repeat the classification operation, the count operation, and the adjusting operation by increasing a depth of the specific layer when the count value becomes lower than a lower limit threshold value.

8. The name identification rule generating apparatus according to claim 7, wherein the name identification rule generating program causes the processor to generate as the second classification character string pattern a character string pattern by leaving a character string corresponding to the first leaf node from the input sentence corresponding to the first abstract syntax tree included in the set if the count value is equal to or higher than the lower limit threshold value and lower than the upper limit threshold value.

* * * * *